United States Patent
Tamburrini et al.

(10) Patent No.: US 6,388,793 B1
(45) Date of Patent: May 14, 2002

(54) SCANNER HAVING CO-MOLDED DITHER SPRING ASSEMBLY AND METHOD OF CONSTRUCTING

(75) Inventors: Thomas E. Tamburrini; Robert W. Rudeen, both of Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/626,055

(22) Filed: Jul. 25, 2000

Related U.S. Application Data

(63) Continuation-in-part of application No. 09/207,491, filed on Dec. 8, 1998, now Pat. No. 6,094,288.

(51) Int. Cl.[7] ............................................. G02B 26/08
(52) U.S. Cl. ..................... 359/212; 359/213; 359/214; 359/223; 359/224; 359/900
(58) Field of Search ................................ 359/212–214, 359/223, 224, 900; 264/1.1, 1.9, 478; 235/462.36

(56) References Cited

U.S. PATENT DOCUMENTS

| | | | |
|---|---|---|---|
| 4,632,501 A | 12/1986 | Glynn | |
| 4,902,083 A | 2/1990 | Wells | |
| 5,009,473 A | 4/1991 | Hunter et al. | |
| 5,475,206 A | 12/1995 | Reddersen et al. | 235/462 |
| 5,629,510 A | 5/1997 | Quinn et al. | 235/462 |
| 6,094,288 A | 7/2000 | Tamburrini et al. | 359/214 |
| 6,114,712 A | 9/2000 | Dvorkis et al. | 250/566 |
| 6,166,375 A | 12/2000 | Ahten et al. | |

*Primary Examiner*—James Phan
(74) *Attorney, Agent, or Firm*—Lyon & Lyon LLP

(57) ABSTRACT

A scan assembly and method of manufacture in which the dither mechanism comprises a co-molded dither spring, dither mount and mirror mount. The method comprises co-molding a living hinge with a base mount on the fixed end of the living hinge and a mirror mount on the free end of the living hinge. The living hinge may be molded out of the same plastic material as the base mount and mirror mount, or the living hinge may be molded out of a more pliable plastic.

15 Claims, 5 Drawing Sheets

DITHER SPRING MOUNTED IN ONE HALF OF MOLD BASE

SCANNER HAVING CO-MOLDED DITHER SPRING ASSEMBLY AND METHOD OF CONSTRUCTING

This application is a continuation in part of application Ser. No. 09/207,491 filed Dec. 8, 1998 U.S. Pat. No. 6,094,288.

BACKGROUND

The field of the present invention relates to optical systems for data reading and particularly to a scanning system employing a dithering mirror actuator.

Typically a data reading device such as a bar code scanner illuminates a bar code and senses light reflected from the code to detect the bars and spaces of the code symbols and thereby derive the encoded data. In a common system, an optical beam of light, such as a laser beam produced by a laser diode is scanned over a scan angle so as to scan the laser spot across the item being read. A variety of mechanical scanning mechanisms are known as described in for example U.S. Pat. Nos. 5,475,206 and 5,629,510 or U.S. application Ser. No. 08/934,487, each of these disclosures hereby incorporated by reference, such scanning mechanisms comprising a rotating polygon mirror, dithering or oscillating mirror, scanning light source or laser diode, rotating/oscillating prisms, holographic elements and others devices. Essentially all these scanners include a supporting structure which allows for movement of the mechanical scanning mechanism.

One method commonly employed for rapidly and repetitively scanning the illumination beam across a scanned region is mirror dithering. Dithering, i.e. rapid rotational oscillation of an illumination beam steering mirror about an axis substantially parallel to the mirror face, causes the illumination beam to move rapidly back and forth generating a scan line. When this scan line illuminates a barcode, the resulting time dependent signal due to detected light scattered and/or reflected from the bars and spaces of the barcode is decoded to extract the information encoded therein. To be used in such scanning applications, the dithering motor generating the mirror motion must be stable and typically employs some sort of feedback between the motor and the motion of the mirror. Particularly for handheld scanning applications, the dithering assembly should be light, compact, reliable, and consume minimum power while producing sufficiently large amplitude motion for scanning.

The dithering mirror assembly typically includes a plastic or metal spring attached at one end to a fixed chassis mount with a mirror mount attached to the other end. The present inventor has recognized difficulties in assembling the spring assembly: gluing the spring to the chassis mount, attaching or clamping the mirror mount onto the spring, and accurately aligning and/or balancing these elements.

SUMMARY OF THE INVENTION

The present invention is directed to a scan module and scanning assemblies therefore in which the dither mechanism comprises dither mount and mirror mount, one or both of which are co-molded onto a dither spring.

DETAILED DESCRIPTION OF PREFERRED EMBODIMENTS

Preferred embodiments will now be described with reference to the drawings. For clarity of description, any element numeral in one figure will represent the same element if used in any other figure.

Figure 1:
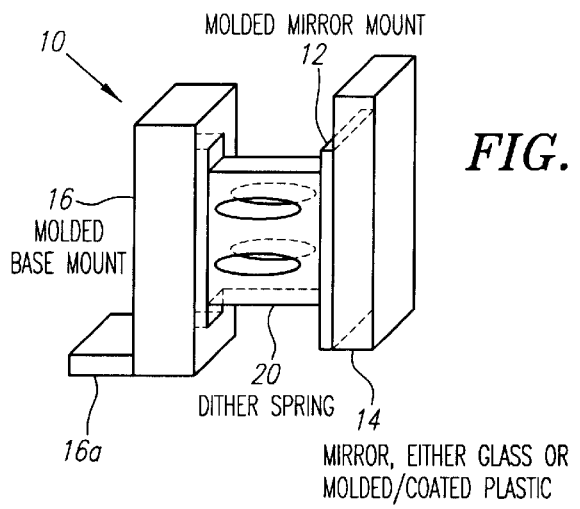
FIG. 1 is a side perspective view of a dither assembly according to a preferred embodiment of the present invention.
Figure 2:
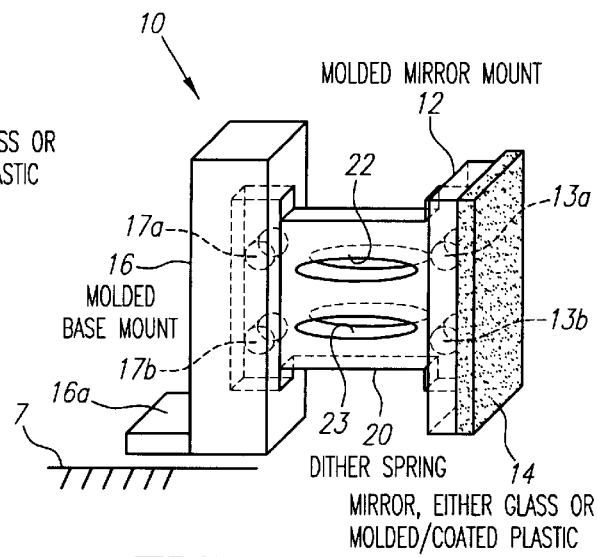
FIG. 2 is a perspective view of the dither assembly of FIG. 1 with mounts shown as transparent to illustrate internal configuration.

FIGS. 1–2 illustrates a dither mechanism 10 comprising a dither spring 20 which is attached at a fixed end to a base mount 16 and at a free end to mirror mount 12. the base mount 16 is illustrated with a pillar shape having a square or rectangular cross section but may be any suitable shape (e.g. round or oval). The base mount 16 may be L-shaped having a lower leg portion 16a which may facilitate more secure mounting to the base or frame 7. The mirror 14 is attached to the mirror mount 12, or may preferably comprise a reflective coating applied to the surface of the mirror mount 12. The coating may be applied by vapor deposition techniques or other suitable coating process.

Figure 3:
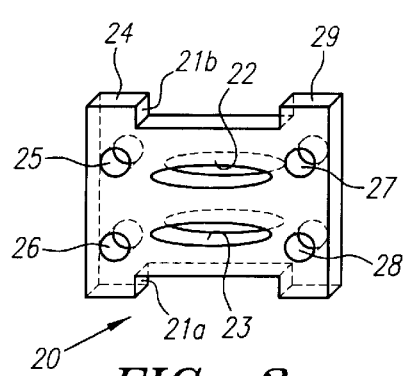
FIG. 3 is a detailed perspective view of the dither spring of FIGS. 1–2.

FIG. 3 illustrates details of the dither spring 20. The dither spring 20 may be constructed of metal (e.g. beryllium copper) or plastic (e.g. Mylar™). The dither spring 20 is a leaf spring form having a fixed end 24 for attachment to the base mount 16 and a free end 29 for attachment to the mirror mount 12. The dither spring is preferably formed with central openings 22, 23 to provide for the desired flexibility of the spring with desired resonant frequency characteristics. The ends 24, 29 of the spring 20 are also provided with openings 25, 26 and 27, 28 which permit plastic material to pass through the spring ends during the molding process thereby providing a stronger bond between the base mount 16 and the spring end 24 and between the mirror mount 12 and the spring end 29. Thus when the liquid for plastic is injected into the mold 30 during the molding process, the base mount 16 is formed with ribs 17a, 17b (see FIG. 2) passing through the openings 25, 26 the mirror mount 12 is formed with ribs 13a, 13b (see FIG. 2) passing through the openings 28, 29. The spring 20 also has indentations 21a, 21b for facilitating insertion into the spring holding mechanism of the mold 30 described further below with respect to FIG. 4.

In a preferred construction, the base mount 16 and mirror mount 12 are integrally molded to the dither spring 20 in the same molding process. FIGS. 3–6 illustrate a preferred method of manufacture in which the dither/spring assembly 10 is formed in a mold 30 whereby the base mount 16 and mirror mount 12 co-molded at the same time (i.e. concurrently) onto the dither spring 20 in the same manufacturing process. A preferred method of manufacture may comprise the steps of positioning the dither spring 20 in a first mold fixture half 32 of the mold 30;

closing the mold halves 32, 38 over both the free end 29 of the dither spring 20 and the fixed end 24;

injecting plastic material into the mold 30 and forming the base mount 16 on the fixed end 24 of the dither spring 20 and the mirror mount 12 on the free end 29;

allowing the assembly 10 to cool;

opening the mold 30 and removing the assembly 10 therefrom;

depositing the mirror surface 14 on the mirror mount 12;

installing the dither spring assembly 10 in the scan module such as to a base or chassis 5.

Figure 6:
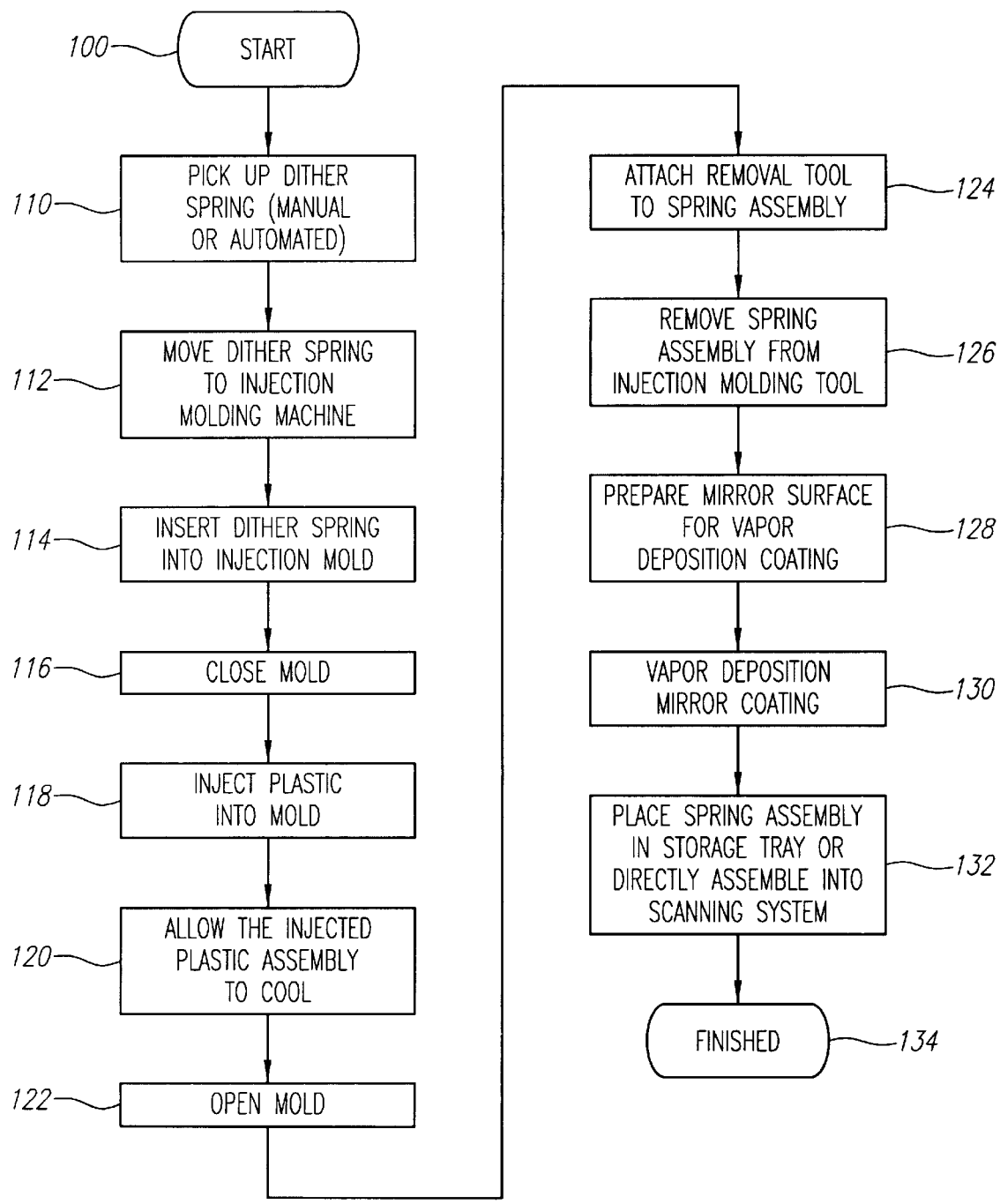
FIG. 6 is flow chart for the assembly process for the dither spring assembly of FIG. 5.

FIG. 6 is a flow chart further detailing a preferred method of manufacture. As illustrated:

Step 100 commence process.

Step 110 pick up dither spring 20, this step may comprise an automated system or a manual process.

Figure 5:
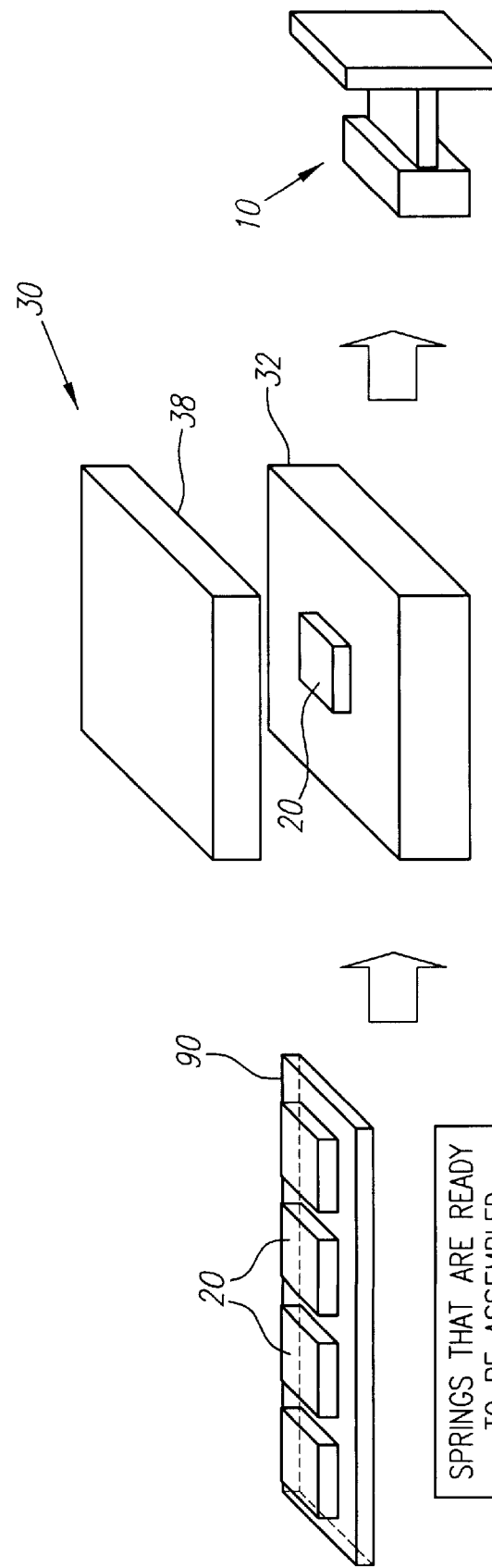
FIG. 5 is a diagram of a preferred assembly process for a dither spring assembly.

Step 112 move the dither spring 20 to the injection molding machine. FIG. 5 illustrates the springs 20 being moved to the mold 30 via a conveyor 90.

Step 114 inserting the dither spring 20 into the injection mold 30. The holding fixture 34 within the mold half 32 facilitates alignment of the dither spring 20 within the mold half 32.

Step 116 closing the mold 30.

Step 118 injecting plastic into the mold 30.

Step 120 forming the spring assembly 10 within the mold 30 and allowing the injected plastic spring assembly 10 to cool. The mold 30 concurrently forms both the molded base mount 16 onto the fixed end 24 of the spring 20 and forms the molded mirror mount 12 on the free end 29 of the dither spring 20.

Step 122 opening the mold 30.

Step 124 attaching a removal tool to the spring assembly 10.

Step 126 removing the spring assembly 10 from the injection mold.

Step 128 preparing a mirror surface of the mirror mount 12 for vapor deposition coating. Alternately, a mirror may be attached to the mirror mount 12.

Step 130 vapor depositing the mirror coating.

Step 132 placing the spring assembly 10 in a storage tray or alternately directly assembling in the scan module.

Step 134 completing process and repeating.

The plastic molding material may be a suitable molding plastic such as polycarbonate for forming the base mount 16 and the mirror mount 12. By molding the mounts 12, 16 directly onto the spring element 20 in the same molding step(s), manufacture is simplified and proper alignment of the spring and mounts is facilitated. The process may also be better suited for automation.

Figure 4:
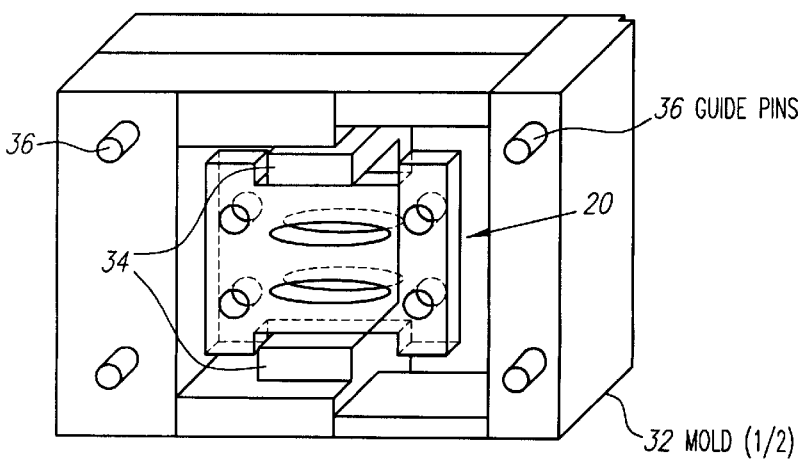
FIG. 4 is a perspective view of a dither spring inserted into position in a first mold half.

As described above, it is preferred that both the base mount 16 and the mirror mount 12 are molded onto the spring element 20 in the same molding operation. In a preferred method, the mold 30 has two sections, one section forming the mirror mount 12 and one section forming the base mount. The two mold sections may comprise a single mold 30 (as illustrated in FIG. 4) or may be separate molds, operating together or independently. Separate molds may allow for variations of the molding process for the mounts 12, 16 such as different materials and/or cure times.

In an alternate construction, the molding operation may form only one of the mounts 12, 16. For example the mirror mount 12 may be molded onto the spring 20. The spring/mirror mount combination 12/20 may then be attached onto a base mount 16 by a suitable mechanism such as screw attachment, adhesive, mounting bracket, or pin or the base mount 16 may then be formed by molding onto the spring 20 in a separate molding process (either before or after molding of the mirror mount 12).

Similarly, the base mount 16 may be molded onto the spring 20. A suitable mirror mount may then be attached to the spring/base mount combination 16/20 by a suitable mechanism such as screw attachment, adhesive, mounting bracket, or pin or the mirror mount 12 may then be formed by molding onto the spring 20 in a separate molding process (either before or after molding of the base mount 12).

Thus it is preferable that both mounts 12, 16 be molded to the spring 20, alternately only one of the mounts 12, 16 may be molded onto the spring 20.

Figure 7:
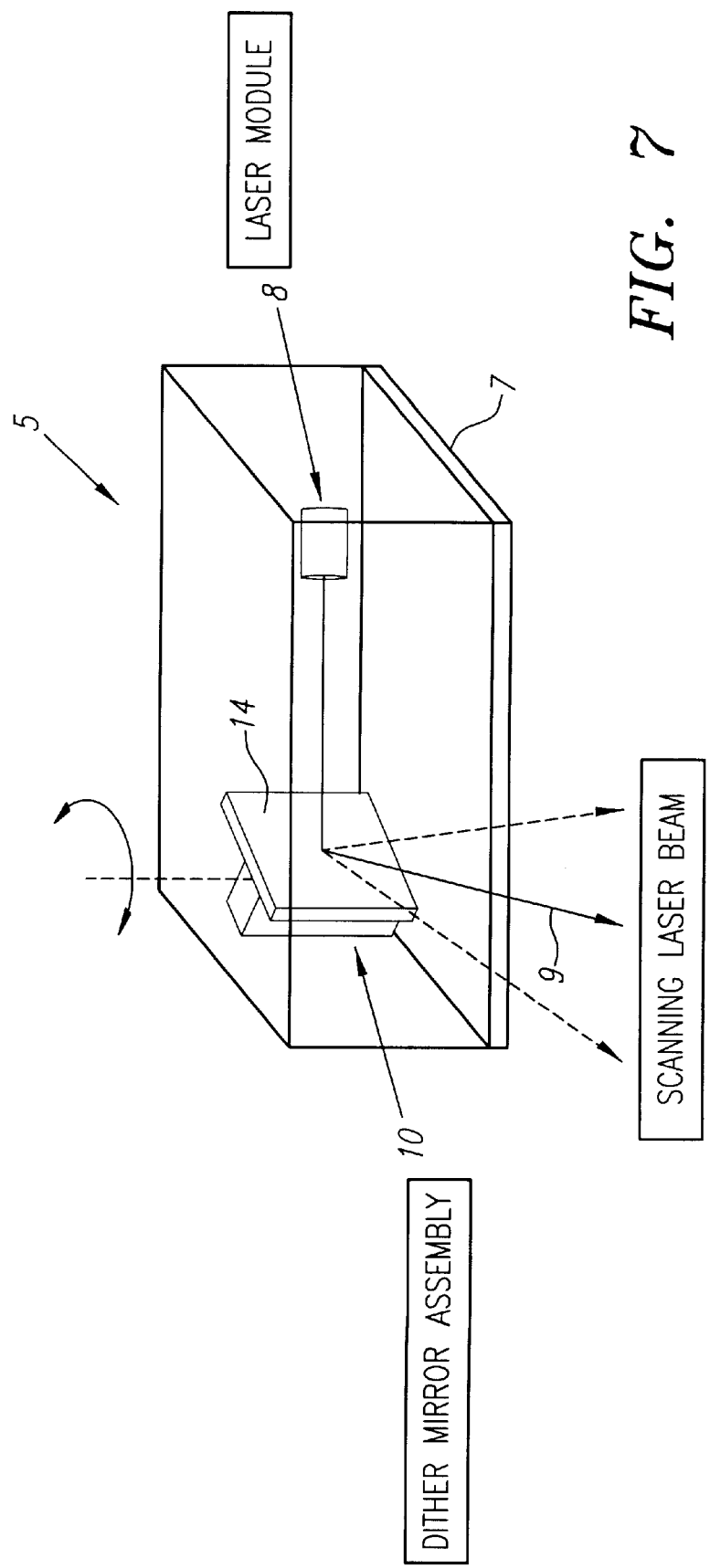
FIG. 7 is a diagrammatic view of a scan module with a dither assembly of FIG. 1 installed therein.

FIG. 7 illustrates a dither spring assembly 10 installed in a scan module 5. The module 5 includes a base or chassis 7 upon which the spring assembly 10 is mounted. The chassis 7 may be a plastic or metal frame or alternately a printed circuit board. The chassis 7 may include an alignment mechanism (such as guides or pins) to facilitate installation and alignment of the assembly 10 thereupon. A light source 8 is also mounted on the chassis or PCB 7. The light source 8 may comprise a laser diode, LED, or other suitable source producing a beam 9 which is directed onto the mirror 14. As the mirror 14 is dither by the motor drive (not shown) the beam 9 is scanned to produce at least one scan line within the scan volume. The scan module 5 may include one or more dither mirror assemblies 10.

Figure 8:
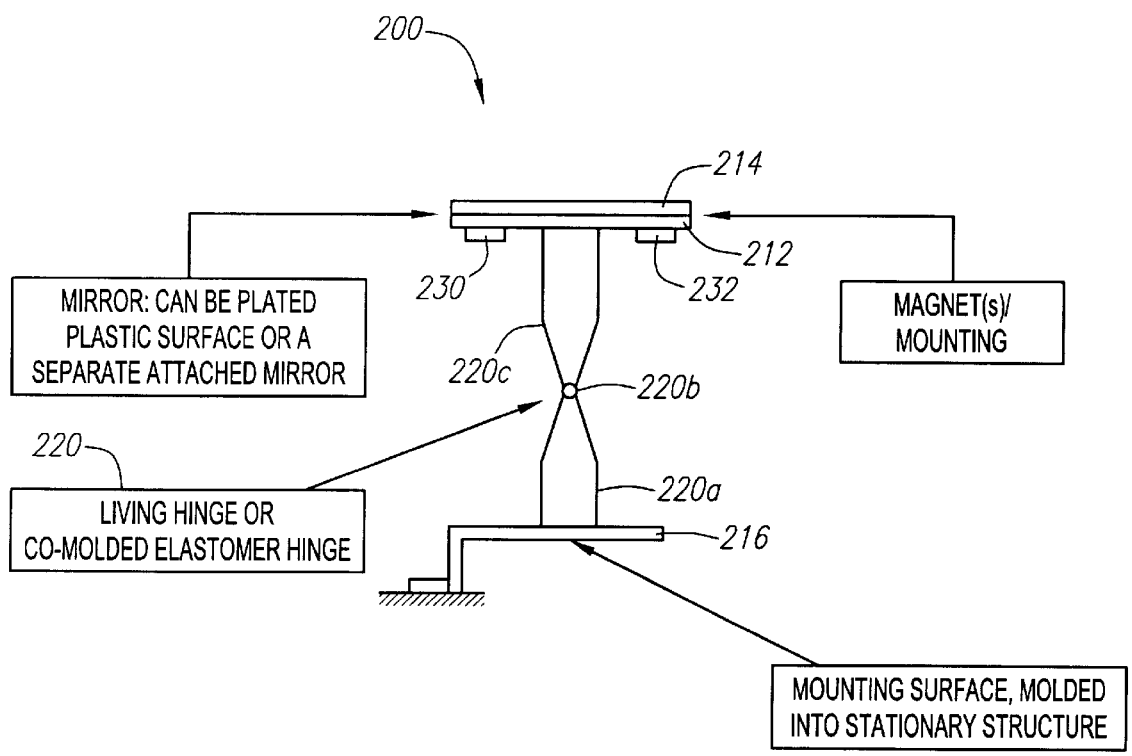
FIG. 8 is a plan view of an alternate dither spring construction.

FIG. 8 illustrates an alternate scan mechanism structure 200 is comprised of a one piece, injection molded, plastic actuator system which can be used in a barcode scanning system. The one piece plastic dither actuator replaces the traditional multi-piece metal or mylar spring and mirror mounting components. Typical springs for a bar code scanner use a separate spring for the mirror actuator system. The spring provides a means for the scanning mirror to be mounted and "scanned". Traditional systems utilize the resonant characteristics of the spring, the one-piece molded spring is preferably non-resonant making it easier to change the scanning rate and angle via frequency and power amplitude adjustment.

The structure 200 is comprised of a living hinge 220 having (a) a first section 220a preferably molded into the mounting structure 216, (b) a second section 220b which has a narrow diameter for accommodating flexure, and (c) a third section 220c preferably molded into the mirror mount 212. The mirror mount 212 may comprise a mirror 214 itself such as a mirror coating or a separately mounted mirror may be applied.

Alternately, a co-molded elastomer hinge may be employed instead of the living hinge 220. The whole assembly is injection molded, but the hinge is preferably constructed of a different durometer material which is more pliable and possibly less subject to fatigue failure over time.

Advantageously, this construction of FIG. 8 does not require assembly of the dither and actuator components. The dither/actuator, which is the only moving part in a barcode scanner, is made from an injection molded part. This construction eliminates several problems associated with system assembly and process capability of the design.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. A method of constructing a dither spring assembly for a dither scan mechanism comprising the steps of positioning a mold;

injecting plastic material into the mold and co-molding (a) a living hinge with a fixed end and free end, (b) a base mount on the fixed end of the living hinge, and (c) a mirror mount on the free end of the living hinge;

allowing the dither spring assembly to cool;

removing the dither spring assembly from the mold.

2. A method according to claim 1 further comprising positioning the mold in an injection molding machine.

3. A method according to claim 1 further comprising depositing a mirror surface on the mirror mount.

4. A method according to claim 1 further comprising mounting a dither mirror on the mirror mount.

5. A method according to claim 1 further comprising installing the dither spring assembly in a scan module.

6. A method according to claim 1 further comprising forming the base mount, mirror mount and living hinge out of the same material.

7. A method according to claim 1 further comprising forming the base mount and the mirror mount out of a first plastic and forming the living hinge out of a second plastic different than the first plastic.

8. A method according to claim 7 wherein the second plastic is more pliable than the first plastic.

9. A dither spring assembly for a dither scan mechanism, comprising a living hinge having a fixed end and a free end;

a base mount formed on the fixed end of the living hinge;

a mirror mount formed on the free end of the living hinge, wherein the living hinge, the base mount and mirror mount are formed together in a co-molding process.

10. A dither spring assembly according to claim 9 wherein the living hinge, the mirror mount and the base mount are molded out of the same plastic material.

11. A dither spring assembly according to claim 9 wherein the base mount and mirror mount are molded out of a first material and the living hinge is molded out of a second material.

12. A dither spring assembly according to claim 11 wherein the second material is more pliable than the first material.

13. A dither spring assembly according to claim 9 wherein the living hinge is molded of plastic.

14. A dither spring assembly according to claim 9 further comprising a mirror formed by depositing reflective material onto the mirror mount.

15. A dither spring assembly according to claim 9 further comprising a mirror mounted onto the mirror mount.

\* \* \* \* \*